(12) United States Patent
Prieditis

(10) Patent No.: US 9,838,301 B2
(45) Date of Patent: Dec. 5, 2017

(54) SYSTEM AND METHOD FOR PREDICTING THE GEOGRAPHIC LOCATION OF AN INTERNET PROTOCOL ADDRESS

(75) Inventor: Armand Erik Prieditis, Mountain View, CA (US)

(73) Assignee: Neustar IP Intelligence, Inc., Sterling, VA (US)

( * ) Notice: Subject to any disclaimer, the term of this patent is extended or adjusted under 35 U.S.C. 154(b) by 247 days.

(21) Appl. No.: 13/173,592

(22) Filed: Jun. 30, 2011

(65) Prior Publication Data

US 2013/0007256 A1   Jan. 3, 2013

(51) Int. Cl.
| | |
|---|---|
| *H04L 29/12* | (2006.01) |
| *H04L 12/721* | (2013.01) |
| *H04L 12/24* | (2006.01) |
| *H04L 12/26* | (2006.01) |

(52) U.S. Cl.
CPC ............ *H04L 45/26* (2013.01); *H04L 41/12* (2013.01); *H04L 61/609* (2013.01); *H04L 43/10* (2013.01)

(58) Field of Classification Search
None
See application file for complete search history.

(56) References Cited

U.S. PATENT DOCUMENTS

| | | | |
|---|---|---|---|
| 7,200,658 B2 * | 4/2007 | Goeller et al. | 709/224 |
| 7,296,088 B1 | 11/2007 | Padmanabhan et al. | |
| 7,581,009 B1 * | 8/2009 | Hsu et al. | 709/226 |
| 7,657,629 B1 * | 2/2010 | Kommula | 709/226 |
| 7,676,576 B1 * | 3/2010 | Kommula | 709/226 |
| 7,889,680 B2 * | 2/2011 | Chan et al. | 370/255 |
| 7,930,540 B2 * | 4/2011 | Ahuja et al. | 713/167 |
| 7,949,757 B2 * | 5/2011 | Joshi | 709/226 |
| 7,949,849 B2 * | 5/2011 | Lowe et al. | 711/173 |
| 8,005,863 B2 * | 8/2011 | de la Iglesia et al. | 707/791 |
| 8,005,981 B2 * | 8/2011 | Tuck et al. | 709/238 |
| 8,010,689 B2 * | 8/2011 | Deninger et al. | 709/230 |
| 8,024,441 B2 * | 9/2011 | Kommula et al. | 709/223 |
| 8,301,635 B2 * | 10/2012 | de la Iglesia et al. | 707/741 |
| 8,307,206 B2 * | 11/2012 | Ahuja et al. | 713/168 |

(Continued)

OTHER PUBLICATIONS

"Constraint-Based Geolocation of Internet Hosts", IEEE/ACM Transactions on Networking 14(6), (Dec. 2006), 14 pgs.

(Continued)

*Primary Examiner* — Ninos Donabed
(74) *Attorney, Agent, or Firm* — Mahamedi IP Law LLP

(57) ABSTRACT

A system and method for predicting the geographic location of an Internet Protocol (IP) address are disclosed. A particular embodiment of the system and method includes receiving a model to predict a geographic coordinates position of a network device given traceroute information corresponding to an Internet Protocol (IP) address of the network device; receiving traceroute information corresponding to an Internet Protocol (IP) address of one or more beacons without requiring the geographic location of the one or more beacons associated with the traceroute information; generating, by use of a processor, an output model representing one or more predicted geographic coordinates corresponding to the network device based on the model and the traceroute information; and returning a result including the predicted geographic coordinates of the network device.

20 Claims, 5 Drawing Sheets

(56) References Cited

U.S. PATENT DOCUMENTS

| | | | |
|---|---|---|---|
| 2003/0074471 A1* | 4/2003 | Anderson et al. | 709/245 |
| 2003/0099202 A1* | 5/2003 | Lear et al. | 370/238 |
| 2003/0195960 A1* | 10/2003 | Merriam | 709/224 |
| 2004/0068582 A1* | 4/2004 | Anderson et al. | 709/245 |
| 2004/0078367 A1* | 4/2004 | Anderson et al. | 707/3 |
| 2004/0078490 A1* | 4/2004 | Anderson et al. | 709/245 |
| 2005/0021738 A1* | 1/2005 | Goeller | H04L 29/12009 709/224 |
| 2005/0267677 A1* | 12/2005 | Poykko et al. | 701/207 |
| 2008/0275753 A1* | 11/2008 | Protheroe et al. | 705/8 |
| 2009/0144411 A1* | 6/2009 | Winkler et al. | 709/224 |
| 2009/0233623 A1* | 9/2009 | Johnson | 455/456.3 |
| 2010/0085903 A1* | 4/2010 | Pandey et al. | 370/311 |

OTHER PUBLICATIONS

European Application Serial No, 12174526.9 Extended EP Search Report dated Oct. 4, 2012, 7pgs.
European Application Serial No. 12174526.9, Response filed Jan. 2, 2013 to Extended European Search Report dated Oct. 4, 2012.
Ziviani, Artur, "An Overview of Internet Measurements: Fundamentals, Techniques, and Trends", [Online]. Retrieved from the Internet: <http://citeseerx.ist.psu.edu/viewdoc/download?doi=10.1.190.1180&rep=rep1&type=pdf>, (Retreived Jun. 1, 2012), 11 pgs.

\* cited by examiner

SYSTEM AND METHOD FOR PREDICTING THE GEOGRAPHIC LOCATION OF AN INTERNET PROTOCOL ADDRESS

TECHNICAL FIELD

Various embodiments illustrated by way of example relate generally to the field of geographic location determination and, more specifically, to a system and method for predicting the geographic location of an Internet Protocol (IP) address.

BACKGROUND

Geography plays a fundamental role in everyday life and affects, for example, the products that consumers purchase, shows displayed on TV, and languages spoken. Information concerning the geographic location of a networked entity, such as a network node, may be useful for any number of reasons.

Geographic location may be utilized to infer demographic characteristics of a network user. Accordingly, geographic information may be utilized to direct advertisements or offer other information via a network that has a higher likelihood of being relevant to a network user at a specific geographic location.

Geographic information may also be utilized by network-based content distribution systems as part of a Digital Rights Management (DRM) program or an authorization process to determine whether particular content may validly be distributed to a certain network location. For example, in terms of a broadcast or distribution agreement, certain content may be blocked from distribution to certain geographic areas or locations.

Content delivered to a specific network entity, at a known geographic location, may also be customized according to the known geographic location. For example, localized news, weather, and events listings may be targeted at a network entity where the geographic location of the networked entity is known. Furthermore content may be presented in a local language and format.

Knowing the location of network entity can also be useful in combating fraud. For example, where a credit card transaction is initiated at a network entity, the location of which is known and far removed from a geographic location associated with an owner of the credit card, a credit card fraud check may be initiated to establish the validity of the credit card transaction.

There are various ways to determine the geographic location of a network entity with varying levels of accuracy. The information sources that may be used to assist the determination of the geographic location of a network entity also have varying levels of accuracy and trustworthiness. These information sources are highly dynamic and subject to widely varying levels of accuracy and trustworthiness over time. As such, systems and methods for determining the geographic location of a network entity must also be highly adaptable.

Various methods of locating electronic emitters to a point on the earth, or geolocating emitters, have been used for many years. These methods include a range of techniques from high-frequency direction finding triangulation techniques for finding a ship in distress to quickly locating the origin of an emergency "911" call on a point-to-point wireline telephone system. These techniques can be entirely passive and cooperative, such as when geolocating oneself using the Global Positioning System or active and uncooperative, such as a military targeting radar tracking its target.

These geolocation techniques may be targeted against a stationary or moving target but most of these direction finding and geolocation techniques start with the assumption they are working with signals in a linear medium. For example, in radio triangulation, several stations each determine the direction from which a common signal was intercepted. Because the assumption can be made that the intercepted signal traveled in a straight line, or at least on a known line of propagation, from the transmitter to each station, lines of bearing can be drawn from each station in the direction from which the signal was intercepted. The point where they cross is the point at which the signal source is assumed to be located.

In addition to the direction of the signal, other linear characteristics can be used to geolocate signals, including propagation time and Doppler shift, but the underlining tenets that support these geolocation methodologies are not applicable to a network environment. Network elements are not connected via the shortest physical path between them, data transiting the network is normally queued and later forwarded depending on network loading causing the data to effectively propagate at a non-constant speed, and switching elements within the network can cause the data to propagate through non-constant routing. Thus, traditional time-distance geolocation methodologies are not effective in a network environment. Network switching and queuing delays can produce echo distance results several orders of magnitude greater than the actual distance between the computers.

In a fully meshed network, every station, from which a geolocation in initiated, is directly connected to every end-point from which an "echo timing" is measured. The accuracy results of geolocation using round-trip echo timing are dependent on: the degree to which the network is interconnected or "meshed," the specific web of connectivity between the stations and endpoints, the number and deployment of stations, the proximity of the stations to the endpoints, and the number and deployment of endpoints chosen.

There are other methods for physically locating a logical network address on the Internet that do not rely on the physics of electronic propagation. One method currently in use for determining the location of a network address relies on network databases. This method of network geolocation looks up the IP address of the host computer to be located, retrieves the physical address of a point of contact for that logical network address from the appropriate registry and then cross-references that physical address to a latitude and longitude.

There are a number of shortcomings to this method. First, the level of resolution to which the address is resolved is dependent on the level of resolution of the information in the registry. Second, there is an assumption that the supplied data in the registry correctly and properly identifies the physical location of the logical network address. It is entirely possible the host associated with the logical address is at a completely different physical location than the physical address given for the technical point of contact in the registry. Third, if the supplied physical address given cannot be cross-referenced to a physical location no geolocation is possible. Geolocation information is often available from network databases but access to and the veracity of this information is uncertain.

In the past, three other approaches have been used in an attempt to solve the problem of accurate IP address geolocation. The first approach uses distance estimates to the target IP address from multiple beacons, each of which has a known location, to "triangulate" the geographic location of the target IP address. In this approach, a beacon is considered a network entity having a known location. In this approach, the distance estimate is based on traceroute information comprising a round-trip transit time of an Internet packet traveling from each beacon to the target IP address. This approach has several shortcomings. First, it requires the geographic location of each beacon, which is often difficult to obtain. Second, it requires an accurate model relating the round-trip transit time to the distance estimate. An accurate model is difficult to develop because it requires knowing precisely the speed at which signals travel over the Internet, which can vary based on network structure, network congestion, queuing delays, router speed, the curvature of the earth, and routing protocols.

A second conventional approach uses machine learning to find a model which relates traceroute information to jurisdictional location (e.g. country, state, county) based on training examples, without requiring the geographic location of each beacon. In this approach, the training examples comprise one or more pairs of the actual geographic location of a target IP address and the round-trip transit times from the one or more beacons. A major shortcoming of this approach is that the jurisdictional location is coarse-grained thus limiting the approach's accuracy.

A third conventional approach finds the latitude and longitude of a "nearest" neighbor in a set of training examples, where the "nearest" neighbor is one whose round-trip transit times are most similar to the round-trip transit times for the target IP address. This approach has several shortcomings. First, it requires a large set of training examples for accuracy. Second, finding the "nearest" neighbor efficiently does not scale up as the number of beacons increases. Storage and retrieval methods such as KD trees can improve efficiency but as the number of beacons increases, these methods degenerate to exhaustive search for the nearest neighbor. Second, it requires a "nearness" measure, which is difficult to develop because each beacon might require a different "nearness" measure. Finally, it cannot extrapolate or interpolate beyond the set of training examples. Mathematically, this approach is called non-parametric because it does not require a model with one or more parameters.

BRIEF DESCRIPTION OF THE DRAWINGS

Embodiments are illustrated by way of example and not limitation in the figures of the accompanying drawings, in which like references indicate similar elements and in which:

FIG. 2 illustrates a view of a portion of the internal processing performed by the Geo-location Prediction Engine;

DETAILED DESCRIPTION

Figure 1:
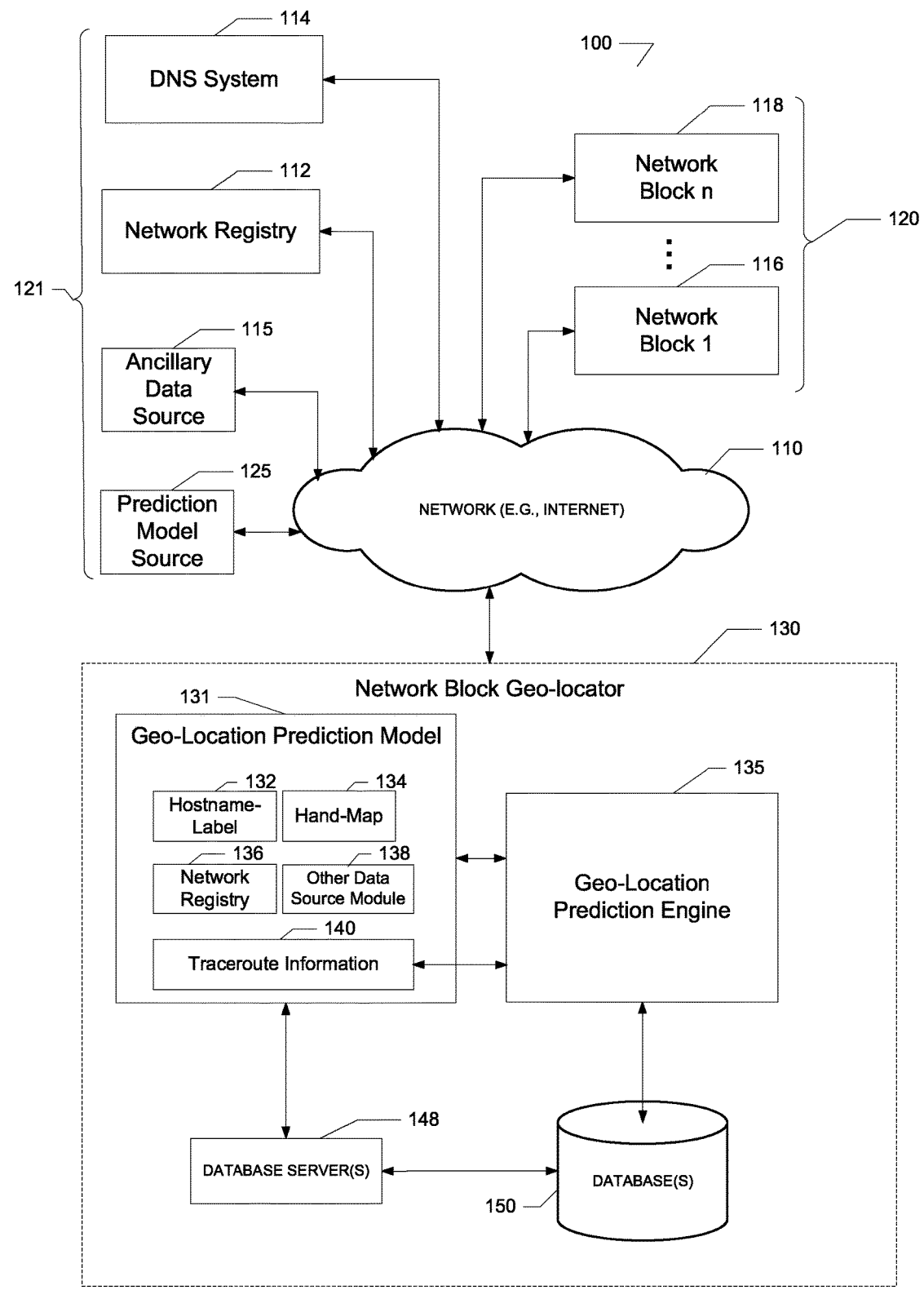
FIG. 1 illustrates a network diagram depicting a system having a set of network blocks and a set of data sources in network communication with a network block geo-locator via network, according to an example embodiment.

According to an example embodiment, a system and method for predicting the geographic location of an Internet Protocol (IP) address is described. Other features will be apparent from the accompanying drawings and from the detailed description that follows. In the following description, for purposes of explanation, numerous specific details are set forth in order to provide a thorough understanding of embodiments. It will be evident, however, to one of ordinary skill in the art that the present description may be practiced without these specific details.

According to various example embodiments described herein, the described embodiments solve the problem of finding a fine-grained geographic location of an IP address based on a parametric model which relates traceroute information (e.g., round-trip transit time and number of hops) from one more beacons to geographic coordinates of the target IP address. The various embodiments are embodied in a system that first receives traceroute information (e.g., round-trip-transit time and number of hops from one or more beacons) associated with a target IP address. In the embodiments described herein, the traceroute information corresponding to an Internet Protocol (IP) address of one or more beacons does not require the geographic location of the one or more beacons associated with the traceroute information. Next, the system predicts geographic coordinates based on the model and the traceroute information. Finally, the system returns a result which indicates the geographic coordinates corresponding to the target IP address. Mathematically, this approach is called parametric because the model that it uses comprises one or more parameters.

For the purposes of the present specification, the term "geographic location" shall be taken to refer to any geographic location or area that is identifiable utilizing any descriptor, metric or characteristic. The term "geographic location" shall accordingly be taken to include a continent, a country, a state, a province, a county, a city, a town, village, an address, a Designated Marketing Area (DMA), a Metropolitan Statistical Area (MSA), a Primary Metropolitan Statistical Area (PMSA), location, zip or postal code areas, and congressional districts. Additionally, "geographic location" or "geographic position" can be defined in terms of country/city/state/address, country code/zip code, political region, geographic region designations, latitude/longitude coordinates, spherical coordinates, Cartesian coordinates, polar coordinates, GPS data, cell phone data, directional vectors, proximity waypoints, or any other type of geographic designation system for defining a geographical location or position. Furthermore, the term "location determinant" shall be taken to include any indication or identification of a geographic location.

The term "network address", for purposes of the present specification, shall be taken to include any address that identifies a networked entity, and shall include Internet Protocol (IP) addresses. The IP address is a numerical label assigned to each device (e.g., computer, printer, network router) connected to a computer network that uses the Internet Protocol for communication.

Typically, most network addresses (e.g., IP addresses) are associated with a particular geographic location. This is because routers that receive packets for a particular set of machines are fixed in location and have a fixed set of network addresses for which they receive packets. The machines that routers receive packets for tend to be geographically proximal to the routers. Roaming Internet-Ready devices are exceptions. For certain contexts, it is important to know the location of a particular network address or set of addresses. Mapping a particular network address to a geographic location may be termed "geolocation". An exemplary system and methodology by which geographic locations can be derived for a specific network addresses, and for address blocks, are described below. Various methods of obtaining geographic information, combining such geographic information, and inferring a "block" to which a network address corresponds and which shares the same geographic information are described. In a particular embodiment, network blocks can be defined as a set of one or more contiguous IP addresses. Other groupings of network address information can also be considered network blocks and within the scope of the various embodiments described herein.

Overview

According to various example embodiments described herein, the system and method predicts geographic coordinates of a target IP address, instead of a jurisdictional location (e.g., a county), based on a model which relates traceroute information to the geographic coordinates. The various embodiments do not require that the location is known for one or more beacons from which the trace is conducted to the target IP address. The model of an example embodiment is parametric (i.e., the model is based on one or more parameters; e.g., it does not involve finding geographic position of a "nearest" neighbor in the training examples). For example, a parametric model is able to interpolate, extrapolate, and aggregate training examples.

The model of an example embodiment comprises one or more parameters (hence the characterization, parametric). For example, a multivariate normal model comprises a mean vector and a covariance matrix. The mean vector might represent the typical round-trip transit times for all beacons and the typical geographic coordinates, and the covariance matrix might represent the deviation associated with pairs of those typical values. Both sets of parameters can be used to predict the geographic coordinates of a target IP address. Other models might have different parameters and different methods by which to combine those parameters. The source data for the model might be derived from training data or supplied by a human. For example, the mean might represent the average from training data. Similarly, the covariance matrix might represent the sample covariance from training data. The model can also be obtained from automated means, but hand-tuned. An important aspect of the model of the various embodiments described herein is that the source of the model is not important for purposes of this invention, only that the form of the model is parametric.

A preferred embodiment involves using as the model a conditional multivariate normal distribution with mean vector m and covariance matrix s. The input to the model is the routing information from one or more beacons and the output is a prediction comprising most likely geographic coordinates and a covariance matrix associated with that prediction. Other example embodiments involve prediction with conditional multivariate normal distributions grouped into one or more subclasses, which enable higher accuracy. It may be possible to use other methods such as neural nets; but, such methods will not achieve the same speed, accuracy, and output as the embodiments described herein. For example, neural nets will not produce a covariance matrix of the predicted geographic coordinates.

The system and method of the various embodiments described herein can be used as an on-demand geographic coordinates prediction engine for a given IP address by performing live traces. The system can also be used in "batch" mode to pre-compute and cache the geographic coordinates of a database of target IP addresses.

The system and method of the various embodiments described herein can be used for fraud detection that involves the prediction of a location of an IP address. Other uses include localized advertising, crime forensics, and helping a business adhere to local, governmental and self-imposed geographic restrictions on usage.

Detailed Description of an Example Embodiment

FIG. 1 illustrates a network diagram depicting a system 100 having a set of network blocks 116 and 118 (collectively network blocks 120) and a set of data sources 121 (e.g., network registry 112 and Domain Name Server (DNS) System 114) in network communication with a network block geo-locator 130 via network 110, according to an example embodiment. Network blocks 120 represent network entities having network addresses within a defined network block or set of network addresses and for which a corresponding geographic location can be determined. Data sources 121 represent various data sources from which geo-location data may be collected. These data sources 121 may include, but are not limited to, traceroute information sources, network registries, DNS servers, network Whois data sources, Border Gateway Protocol (BGP) tables, network administrative data, geographic databases, user demographic/profile information, governmental data sources, remote data collection agents hosted on data collection machines, and the like. In addition, data sources 121 can also include ancillary data source 115 from which other network information can be obtained (e.g. whether a network is routable, the type of data connection, etc.).

Data sources 121 provide geo-location information that may be used to determine the geographic location of a network entity with varying levels of accuracy and trustworthiness. Geo-location information provided by some data sources 121 may be used to validate or corroborate the information provided by other data sources 121. These information sources are highly dynamic and subject to widely varying levels of accuracy and trustworthiness over time. As described in more detail herein, various embodiments provide highly adaptable systems and methods for determining the geographic location of a network entity.

Data sources 121 can also include one or more geo-location prediction model sources 125. These sources 125 can provide various geo-location prediction models, which can use various methods for processing the data collected from other data sources 121 and for producing a prediction of a likely geo-location based on the collected data. Different types of geo-location prediction models can produce different geo-location predictions with varying levels of accuracy and specificity. Given a particular type of data collected from various data sources 121, it may be beneficial to use a particular geo-location prediction model over another model. As such, the example embodiments described herein are configured to use any of a plurality of available geo-location prediction models as part of the generation of a geographic coordinates prediction for a particular set of input data as described in more detail below.

In a particular embodiment described herein, traceroute information can be used by or with the geo-location prediction model to generate a geographic coordinates prediction from a set of input traceroute information. As will be described in more detail herein, the geographic information associated with a plurality of traceroutes of varying quality and accuracy can be processed to produce an accurate geographic location (e.g., latitude/longitude position) prediction of a network block based on the input traceroute information.

Traceroute or tracerouting describes a well-known process in a data network to identify the route that a particular data packet or set of data packets take from a source node of a network to a target or destination node. In other words, tracerouting is a technique for tracing the path of a data packet from a source network entity to a destination network entity. In a particular embodiment, traceroute is a computer network tool used to determine the route taken by packets across an Internet Protocol (IP) network. Tracerouting can use Internet Control Message Protocol (ICMP) packets to accomplish the traceroute. ICMP and its family of versions is one of the core protocols of the Internet protocol suite. It is chiefly used by networked computers' operating systems to send error messages indicating, for instance, that a requested service is not available or that a host or router could not be reached. Routers, switches, servers, and gateways on the data path can provide geo-location information associated with the source network entity or the destination network entity.

In most cases, the output of a traceroute operation is an identification of a series of routers, along with corresponding hop delays, and some other ancillary data that defines the path from a source node to a destination node. This output is denoted as a traceroute. Essentially, traceroutes provide a complete or partial approximation of the currently active router path from one IP address to another. Traceroutes can be useful in "geolocating" a network address. It is worth noting that there are various conventional ways of generating these router paths (i.e. traceroutes) from one IP address to another.

It is possible for a source network entity (i.e. node) and a destination node to be in different autonomous network systems. An autonomous system (AS) is a homogenous network including a group of network nodes operating under a common data transfer protocol. Autonomous systems will often use gateways for entry into and out of the autonomous system and to enable data communications with nodes in a different autonomous system. In the context of the Internet, an autonomous system can be a collection of IP networks and routers under the administrative control of one or more entities that present a common routing policy to the Internet. Any routable IP address on the Internet belongs to an autonomous system. The Border Gateway Protocol (BGP) is one of the core routing protocols of the Internet. BGP works by maintaining a table of IP networks or prefixes, which designate network reachability among autonomous systems (AS). The mapping from an IP address to the corresponding autonomous system is implicit in BGP.

Using BGP routing information, it can be determined whether a router is in the same autonomous system as the target IP address of a traceroute. Typically, a last known router, on a traceroute to a given target IP address, is likely to be geographically closer to the target IP address, if the last known router is in the same autonomous system as the target IP address. Further, a traceroute that has penetrated more deeply into an autonomous system is likely to provide more reliable geographic information.

In order to use traceroutes in an IP address geo-location system of an example embodiment, the example embodiment can enhance the router information with IP-geolocation data associated with each router, gateway, or other type of network node. For instance, for each router, we may associate a geolocation with that router. The geolocation can be defined in terms of country/city/state/address, country code/zip code, political region, geographic region designations, latitude/longitude coordinates, spherical coordinates, Cartesian coordinates, polar coordinates, GPS data, cell phone data, directional vectors, proximity waypoints, or any other type of geographic designation system for defining a geographical location. Using BGP routing information, the example embodiment can also associate an autonomous system with the router. A general geographical boundary of the autonomous system can be inferred based on the geo-locations of the routers of the autonomous system. The enhancement of traceroutes with geolocation information can be denoted enhanced traceroutes or traceroute information.

The geographical locations of routers in the traceroute to a given target IP address can be useful in determining the geographical location of that target IP address. The geographical location of the last router in a traceroute that reaches its target (i.e. completes) is an important location in the IP address geolocation of the target IP address. After all, the last router is just one "hop" away from the target. Because the last router is the closest router to the target in terms of network routing; the last router might also be the closest router geographically.

Often traceroutes do not complete; that is, they do not reach their target IP address. This could be due to the target IP address not actually being active. Alternatively, a traceroute may not complete because of firewall and/or network security settings. Nevertheless, based on the incomplete traceroute, a best estimate for the location of the target IP address might be a location proximate to the last known router.

Sometimes because of the limitations of IP address geo-location technology, the geographical location of the router or routers closest to the target IP address is not known with high confidence. Nevertheless, based on the complete traceroute, a best estimate for the location of the target IP address might be a location proximate to the location of the last known router for which a geolocation is known with a high degree of confidence.

In all of these cases, traceroutes can be useful in providing an estimate of IP address geolocation; but, the confidence in this estimate may vary depending on any limitations there may be in obtaining the traceroute between a source IP address and a target IP address.

Traceroutes can be collected as raw data. This raw data is processed to extract geo-location-relevant information from the raw data collected from the data sources 121. Geographic cues from the traceroutes, including determination of the confidence in that data, can be extracted at this point. This extracted geo-location-relevant information can be used to associate available geo-location-relevant information with the network blocks to which the information relates. In this manner, untested or incomplete geo-location information can be initially associated with particular network blocks. This geo-location-relevant information is further processed to determine a geographical location based on the extracted geo-location-relevant information. The information from the traceroute and from other IP address geolocation data sources, such as whois data, can be used to determine a geographical location of a network block. The geographical location can be mapped to a network block. The geographical location and the mapped network block can be provided to other applications.

There are several types of traceroute statistics or metadata that can be generated for a set of collected traceroute information in a particular embodiment. These statistics can include the following:

Autonomous system or network penetration based statistics;

Network-based traceroute convergence statistics; and

Various other traceroute statistics, such as:
- a distillation of ICMP return message status for the last hop of the traceroute
- whether the traceroute completed
- the number of hops from the traceroute end to the last known router A particular embodiment can consider the autonomous system of routers in a traceroute, in relation to the target IP address, in order to assess the confidence in the geolocation of the last known router in a traceroute. This is an especially powerful approach in cases where a traceroute's last known router is not: (a) the last router, and (b) from a complete traceroute.

In a particular embodiment, autonomous system penetration is associated with a router on a traceroute. Autonomous system penetration is the count of hops on the traceroute from the first hop that enters the target autonomous system to the last known router of the traceroute, where all of the known routers in between are also within the target autonomous system. Typically, if the last known router of a traceroute is in the same autonomous system as the target, the geographical location of the last known router is more likely to be closer to a target IP address. Moreover, the deeper the autonomous system penetration, the closer the last known router tends to be geographically to the target IP address.

Another useful concept is that of autonomous system size. In a particular embodiment, the autonomous system size is defined as the number of IP addresses that are currently routable within a given autonomous system. Another useful statistic for predicting the closeness of a last known router to the true location of a target IP address is the ratio of the autonomous system penetration and autonomous system size; this ratio is called the autonomous system penetration to size ratio. These autonomous system statistics or metadata can also be considered when processing a particular set of traceroute information.

In a particular embodiment, the geolocation associated with a particular traceroute can be more trustworthy when its geolocation is the same, or close to, the geolocation associated with several other traceroutes in the same network. The complement is also true: the geolocation associated with a particular traceroute can be less trustworthy when its geolocation is substantially different than other traceroutes for the same network. The degree to which different traceroutes for a network converge/agree or diverge/disagree on IP address geolocation correlates with the goodness (e.g., accuracy or reliability) of the traceroute's geolocation. Thus, statistics that indicate convergence are useful features in determining a reliable geo-location.

In a particular embodiment, several traceroute convergence statistics may be used. For a given network, there can be more than one traceroute collected for that network. The different traceroutes may vary in several different dimensions of collection, for example:
- the time when the traceroute was collected
- the specific target IP address within the network of interest.
- the network from which the traceroute was collected.

All of these variables may impact the collected traceroutes. If the last known router in the traceroute is used as an IP address geolocation cue, the last known router for these different traceroutes to a given network may vary. Thus, there may be several different IP address geolocations for a given network based on these different traceroutes.

In the case where a complete traceroute is available and the last hop of a traceroute that completed is associated with a given country, state, or city (e.g., jurisdictional location data), the jurisdictional location data can be used to generate the geographic coordinates geo-location data and to generate a geographic coordinates geo-location prediction. In the case where a complete traceroute is not available or the last hop of a traceroute that did not actually complete was associated with a given country, state, or city (e.g., jurisdictional location data), the jurisdictional location data can also be used to generate the geographic coordinates geo-location data and to generate a geographic coordinates geo-location prediction as best as can be determined from the incomplete data. Further details of the generation of the geographic coordinates geo-location data and the generation of the geographic coordinates geo-location prediction are provided below in connection with FIG. 2 and FIG. 3.

Referring still to FIG. 1, the Network Block Geo-locator 130 of an example embodiment includes Geo-location Prediction Model 131 and Geo-location Prediction Engine 135. As described above, Geo-location Prediction Model 131 can be obtained from a geo-location prediction model source 125. The particular geo-location prediction model 131 can be downloaded in whole or in part to Network Block Geo-locator 130. Alternatively, the particular geo-location prediction model 131 can be hosted at the source 125 and used by the Network Block Geo-locator 130 via network 110. As described above, the geo-location prediction model 131 can use various methods for processing the data collected from other data sources 121 and for producing a prediction of a likely geo-location based on the collected data. In a particular embodiment, the geo-location prediction model 131 can use traceroute information 140 to produce geo-location data for Geo-location Prediction Engine 135. The traceroute information 140 can be obtained using well-known techniques, as described above. The Geo-location Prediction Engine 135 can also use the traceroute information 140 as described in more detail below in connection with FIG. 2 and FIG. 3.

Figure 2:
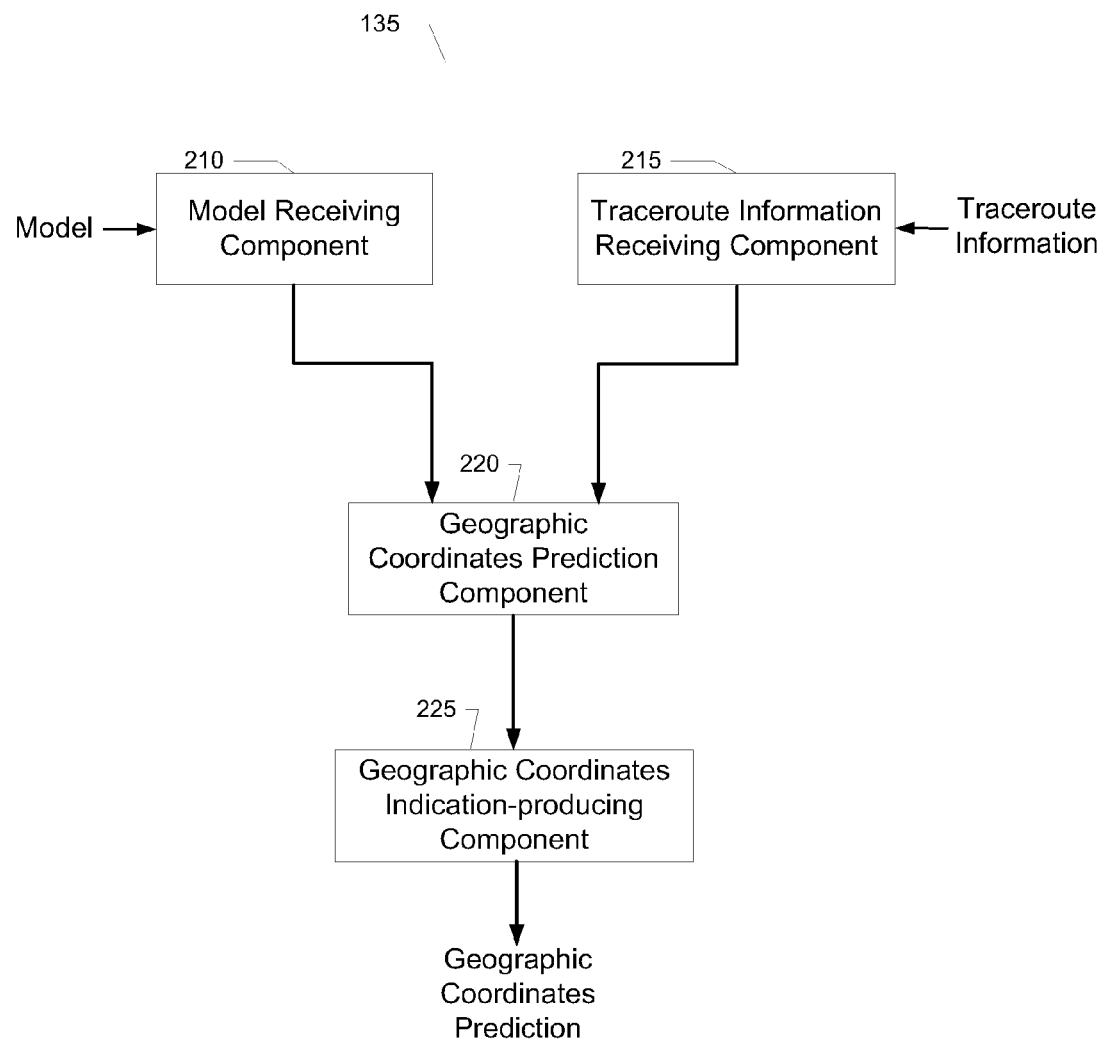
FIG. 2 illustrates an overall view of an example embodiment. In particular.

FIG. 2 illustrates an overall view of an example embodiment. In particular, FIG. 2 illustrates a view of a portion of the internal processing performed by the Geo-location Prediction Engine 135. As shown in FIG. 2, the Geo-location Prediction Engine 135 of an example embodiment can receive and/or use any of a plurality of available Geo-location Prediction Models 131. A Model Receiving Component 210 can handle the fetching, installation/connection, and configuration of any of the geo-location prediction models available from the model source 125. The particular Geo-location Prediction Model 131 received or used by Model Receiving Component 210 can produce geo-location data for use by the Geo-location Prediction Engine 135.

A Traceroute Information Receiving Component 215 can be used to obtain traceroute information related to a desired target network entity or network block. As described above, the traceroute information can be obtained using well-known techniques. The geo-location data produced by Geo-location Prediction Model 131 and the traceroute information obtained from Traceroute Information Receiving Component 215 can be used by the Geographic Coordinates Prediction Component 220 to produce a predicted geographic coordinates position corresponding to a desired target network entity or network block based on the traceroute information and the geo-location data produced by Geo-location Prediction Model 131. Information indicative of the predicted geographic coordinates position can then be generated by the Geographic Coordinates Indication-producing Component 225. The information indicative of the predicted geographic coordinates position that corresponds to the desired target network entity or network block can be provided to a requesting party or stored in a database 150 for future reference.

Figure 3:
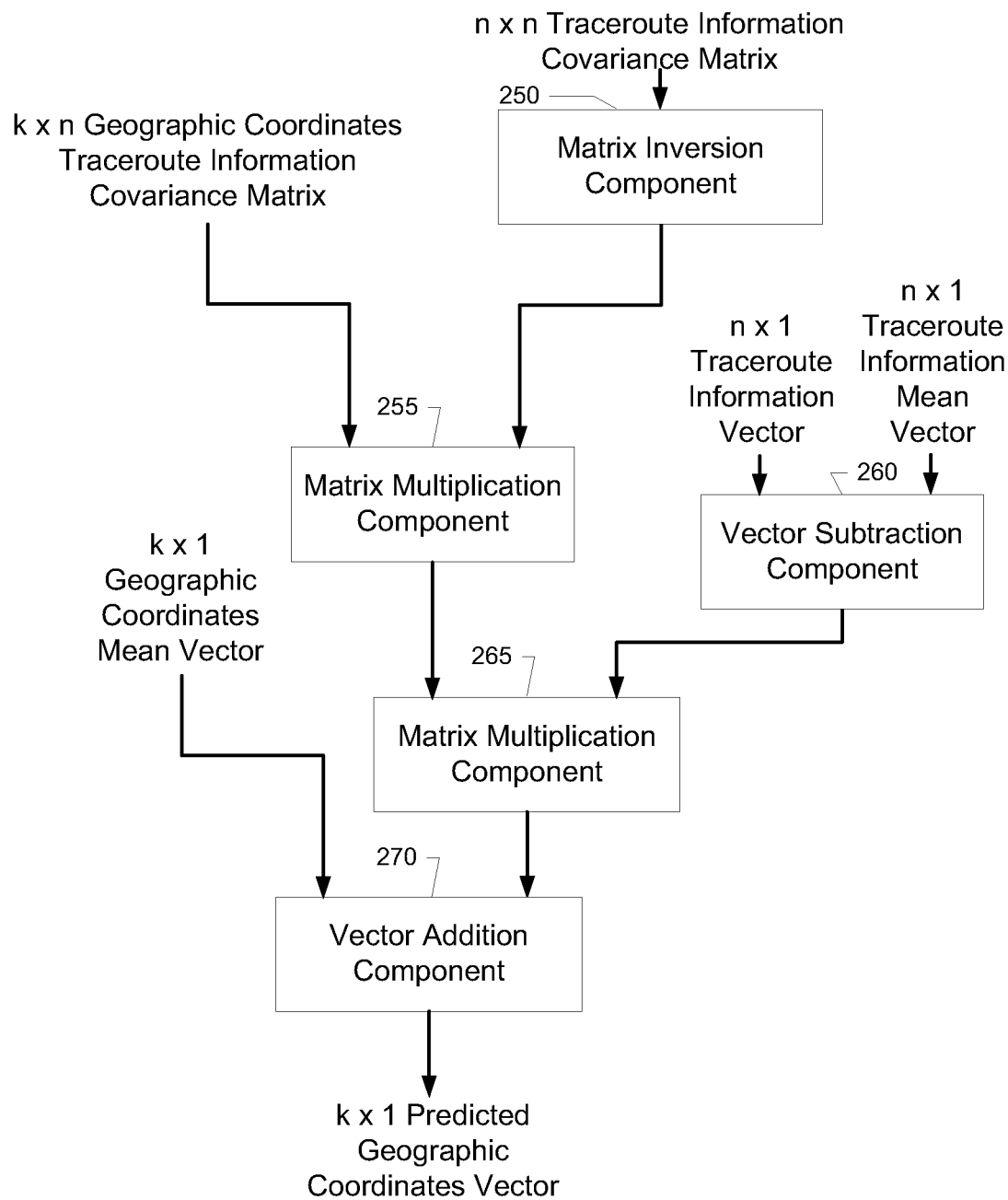
FIG. 3 illustrates the use of a conditional multivariate normal distribution to predict geographic coordinates, given various forms of the input traceroute information.

FIG. 3 illustrates a method used by the Geographic Coordinates Prediction Component 220 to produce a predicted geographic coordinates position corresponding to a desired target network entity or network block. In particular, the example method shown in FIG. 3 illustrates the use of a conditional multivariate normal distribution to predict geographic coordinates, given various forms of the input traceroute information. In this example, the various forms of the input traceroute information includes: 1) an n×n traceroute information covariance matrix, which represents how the traceroute information co-varies with itself (n is the number of components which comprise the traceroute information); 2) a k×n geographic coordinates traceroute information covariance matrix, which represents how the target geographic coordinates position co-varies with the traceroute information (k is the number of components which comprise the geographic coordinates); 3) a k×1 geographic coordinates mean vector, which represents the average (or typical) values of the output geographic coordinates; 4) an n×1 traceroute information mean vector, which represents type the average (or typical) values of the traceroute information; and 5) an n×1 traceroute information vector, which represents the actual traceroute information for an IP address for which the geographic coordinates are to be predicted. As denoted herein and in FIG. 3, n is the number of components which comprise the traceroute information and k is the number of components which comprise the geographic coordinates. Each of these traceroute information inputs, as shown in FIG. 3, is used by the Geographic Coordinates Prediction Component 220 to produce a predicted geographic coordinates position corresponding to a desired target network entity or network block.

As shown in FIG. 3, a multivariate normal model comprises a mean vector and a covariance matrix. The mean vector might represent the typical round-trip transit times for all beacons and the typical geographic coordinates, and the covariance matrix might represent the deviation associated with pairs of those typical values. Both sets of parameters can be used to predict the geographic coordinates of a target IP address. Other models might have different parameters and different methods by which to combine those parameters. The source data for the model might be derived from training data or supplied by a human. For example, the mean might represent the average from training data. Similarly, the covariance matrix might represent the sample covariance from training data. The model data can also be obtained from automated means, but hand-tuned. An important aspect of the model of the various embodiments described herein is that the form of the model is parametric.

An example embodiment involves using, as the model, a conditional multivariate normal distribution with mean vector m and covariance matrix s. The input to the model is the routing information from one or more beacons and the output is a prediction comprising most likely geographic coordinates and the covariance of that prediction. Other example embodiments involve prediction with conditional multivariate normal distributions grouped into one or more subclasses, which enable higher accuracy. It may be possible to use other methods such as neural nets; but, such methods will not achieve the same speed, accuracy, and output as the embodiments described herein. For example, neural nets will not produce a covariance matrix of the resulting geographic coordinates. In one embodiment, the predicted geographic coordinates position of the network device is based upon an interpolation between at least two traceroutes.

The processing operations shown in FIG. 3 can be viewed as a way to adjust the typical geographic coordinates position of an IP address (not necessarily the target one) with information from the traceroute. In particular, the matrix inversion operation performed by Matrix Inversion Component 250, the vector subtraction operation performed by the Vector Subtraction Component 260, and the matrix multiplication operations performed by Matrix Multiplication Components 255 and 265 determine how to weight the difference between the typical traceroute values and the actual traceroute values for an IP address for which the geographic coordinates are to be predicted. The vector addition operation performed by the Vector Addition Component 270 combines the weighted traceroute variances for a particular IP address with the average (or typical) values of the output geographic coordinates. The output produced by the Geographic Coordinates Prediction Component 220, as shown in FIG. 3, is a k×1 predicted geographic coordinates vector that represents most likely geographic coordinates for this conditional multivariate normal distribution corresponding to the actual traceroute values for the IP address for which the geographic coordinates are to be predicted. The output predicted geographic coordinates vector can be provided to the Geographic Coordinates Indication-producing Component 225, as shown in FIG. 2, which can generate geographic coordinates data in a form suitable for a particular requesting application or database repository. As described above, the generated geographic coordinates data can include geographic coordinates in terms of geographic region designations, latitude/longitude coordinates, spherical coordinates, Cartesian coordinates, polar coordinates, GPS data, cell phone data, directional vectors, proximity waypoints, or any other type of geographic designation system for defining a geographical location.

Figure 4:
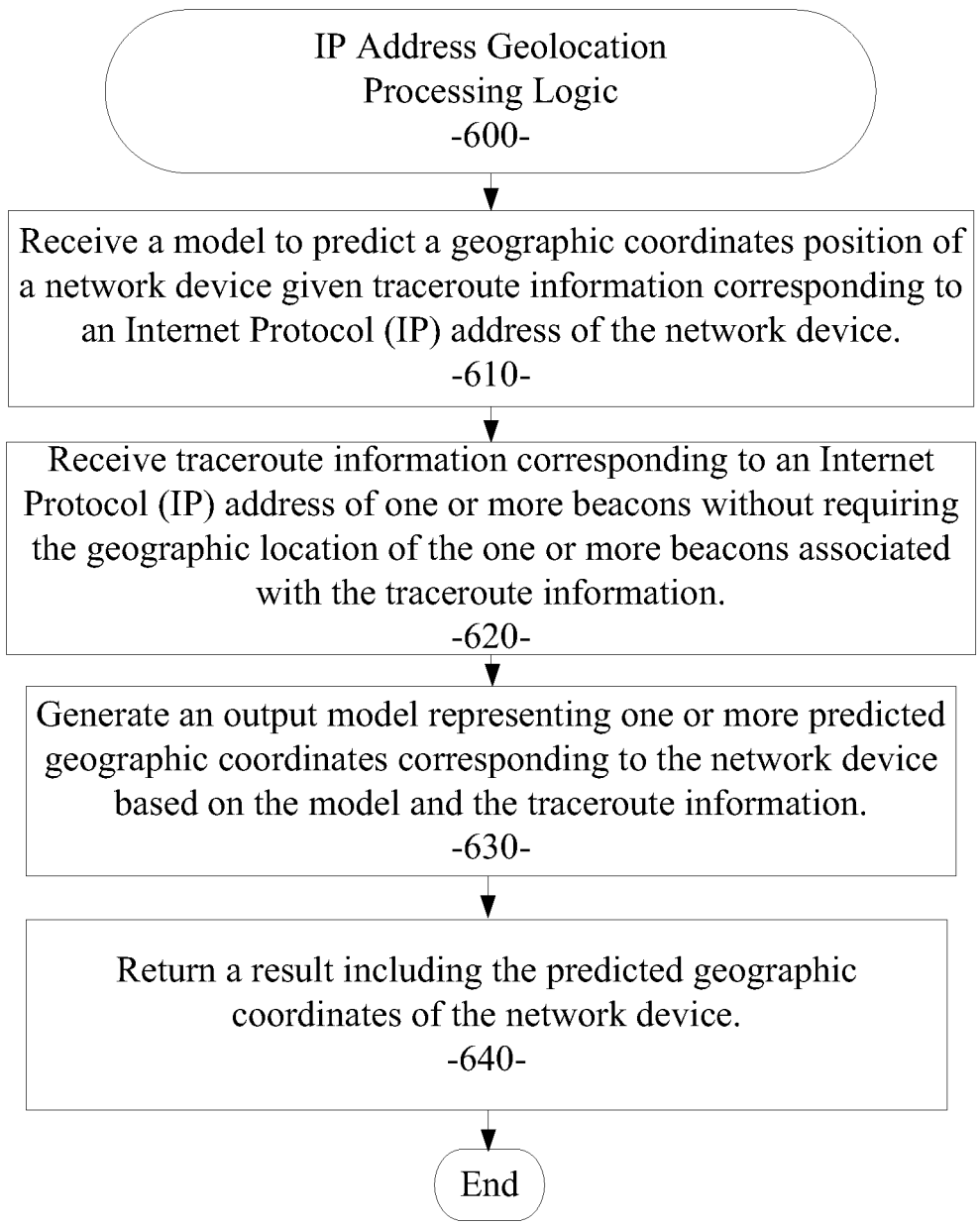
FIG. 4 illustrates an example method for predicting the geographic location of an Internet Protocol (IP) address in a particular embodiment.

FIG. 4 illustrates an example method for predicting the geographic location of an Internet Protocol (IP) address, the method including receiving a model to predict a geographic coordinates position of a network device given traceroute information corresponding to an Internet Protocol (IP) address of the network device (processing block 610); receiving traceroute information corresponding to an Internet Protocol (IP) address of one or more beacons without requiring the geographic location of the one or more beacons associated with the traceroute information (processing block 620); generating, by use of a processor, an output model representing one or more predicted geographic coordinates corresponding to the network device based on the model and the traceroute information (processing block 630); and returning a result including the predicted geographic coordinates of the network device (processing block 640).

Figure 5:
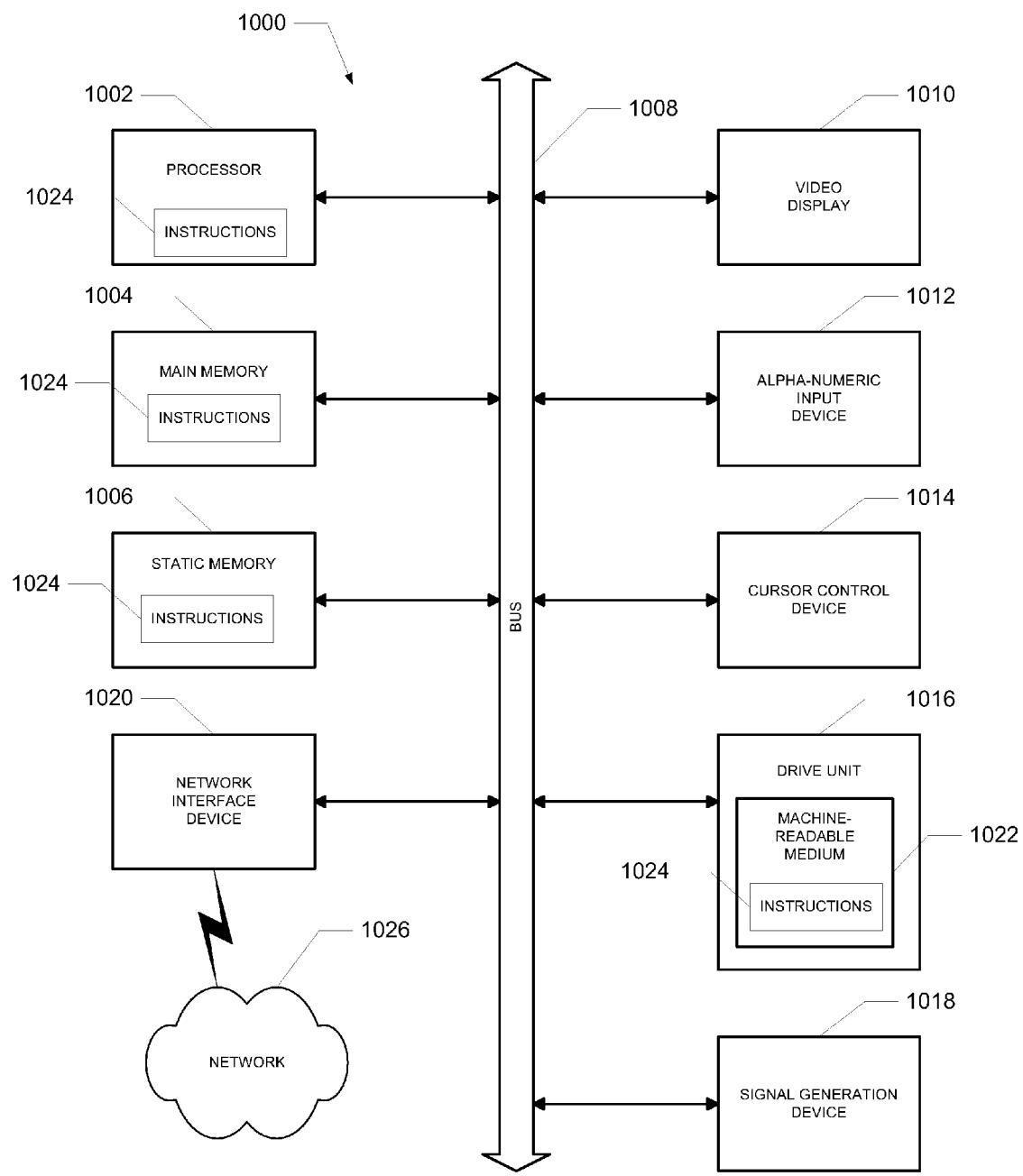
FIG. 5 shows a diagrammatic representation of a machine in the example form of a computer system.

FIG. 5 shows a diagrammatic representation of a machine in the example form of a computer system 1000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein. The instructions 1024 may also reside, completely or at least partially, within the main memory 1004, the static memory 1006, and/or within the processor 1002 during execution thereof by the computer system 1000. The main memory 1004 and the processor 1002 also may constitute machine-readable media. The instructions 1024 may further be transmitted or received over a network 1026 via the network interface device 1020.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In example embodiments, a computer system (e.g., a standalone, client or server computer system) configured by an application may constitute a "module" that is configured and operates to perform certain operations as described herein below. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any non-transitory medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical media, and magnetic media.

As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The following description includes terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, a system and method for predicting the geographic location of an Internet Protocol (IP) address have been described. Although embodiments have been described with reference to specific example embodiments, it will be evident that various modifications and changes may be made to these embodiments without departing from the broader spirit and scope of embodiments as expressed in the subjoined claims.

What is claimed is:

1. A method of controlling access to server resources over a network, the method comprising:
  receiving, at a server on the network, a request for server resources from a network device;

receiving a geographic prediction model to predict geographic coordinates of the network device, wherein the geographic prediction model includes conditional multivariate normal distributions grouped into one or more subclasses, each distribution having a mean vector representing typical traceroute information between a plurality of training network devices and one or more beacons;

receiving traceroute information between the network device and Internet Protocol (IP) addresses for the one or more beacons associated with the geographic location prediction model without requiring a geographic location for at least one of the beacons;

generating, by use of a processor, predicted geographic coordinates for the network device by using the geographic prediction model to compare the traceroute information with geographic locations of the plurality of training network devices; and generating a result including the predicted geographic coordinates of the network device and an associated covariance matrix, wherein the result causes the server to grant the network device access to one or more server resources.

2. The method of claim 1 wherein the geographic prediction model is a parametric model.

3. The method of claim 1 including using at least one traceroute information covariance matrix.

4. The method of claim 1 including using at least one traceroute information mean vector.

5. The method of claim 1 wherein the result includes a predicted geographic coordinates vector.

6. The method of claim 1 including using at least one geographic coordinates mean vector.

7. The method of claim 2 including using at least one geographic coordinates traceroute information covariance matrix and at least one traceroute information covariance matrix.

8. An Internet Protocol (IP) address geo-location prediction engine comprising:
   a processor;
   a network block geo-locator to receive, at a server on a network, a request for server resources from a network device;
   a model receiving component to receive a geographic prediction model to predict geographic coordinates of the network device, wherein the geographic prediction model includes conditional multivariate normal distributions grouped into one or more subclasses, each distribution having a mean vector representing typical traceroute information between a plurality of training network devices and one or more beacons;
   a traceroute information receiving component, in data communication with the processor, to receive between the network device and Internet Protocol (IP) addresses for the one or more beacons associated with the geographic location prediction model without requiring a geographic location for at least one of the beacons;
   a geographic coordinates prediction component to generate predicted geographic coordinates for the network device by using the geographic prediction model to compare the traceroute information with geographic locations of the plurality of training network devices; and
   a geographic coordinates indication-producing component to generate a result including the predicted geographic coordinates of the network device and an associated covariance matrix, wherein the result causes the server to grant the network device access to one or more server resources.

9. The geo-location prediction engine of claim 8 wherein the geographic location prediction model is a parametric model.

10. The geo-location prediction engine of claim 8 including a matrix multiplication component and a matrix inversion component.

11. The geo-location prediction engine of claim 8 including a vector subtraction component and a vector addition component.

12. The geo-location prediction engine of claim 8 including a traceroute information covariance matrix.

13. The geo-location prediction engine of claim 8 including a traceroute information mean vector.

14. The geo-location prediction engine of claim 8 wherein the result includes a predicted geographic coordinates vector.

15. The geo-location prediction engine of claim 8 including a geographic coordinates mean vector.

16. An article of manufacture comprising a non-transitory machine-readable storage medium having machine executable instructions embedded thereon, which are executed by a machine to:
   receive, at a server on a network, a request for server resources from a network device;
   receive a geographic prediction model to predict geographic coordinates of the network device, wherein the geographic prediction model includes conditional multivariate normal distributions grouped into one or more subclasses, each distribution having a mean vector representing typical traceroute information between a plurality of training network devices and one or more beacons;
   receive traceroute information between the network device and Internet Protocol (IP) addresses for the one or more beacons associated with the geographic location prediction model without requiring a geographic location for at least one of the beacons;
   generate, by use of a processor, predicted geographic coordinates for the network device by using the geographic prediction model to compare the traceroute information with geographic locations of the plurality of training network devices; and
   generate a result including the predicted geographic coordinates of the network device and an associated covariance matrix, wherein the result causes the server to grant the network device access to one or more server resources.

17. The article of manufacture of claim 16 wherein the geographic location prediction model is a parametric model.

18. The article of manufacture of claim 16 wherein the predicted geographic coordinates are a latitude/longitude coordinates position.

19. The article of manufacture of claim 16 wherein the predicted geographic coordinates are a Cartesian coordinates position.

20. The article of manufacture of claim 16 wherein the predicted geographic coordinates are a spherical coordinates position.

* * * * *